United States Patent
Boer Den et al.

(10) Patent No.: US 9,115,281 B2
(45) Date of Patent: Aug. 25, 2015

(54) MULTICOMPONENT RESIN SYSTEM

(75) Inventors: Arie Boer Den, Kampen (NL); Johan Franz Gradus Antonius Jansen, Geleen (NL); Daniel Raimann, Baretswil (CH)

(73) Assignee: DSM IP ASSETS B.V., Heerlen (NL)

( * ) Notice: Subject to any disclaimer, the term of this patent is extended or adjusted under 35 U.S.C. 154(b) by 217 days.

(21) Appl. No.: 13/577,752

(22) PCT Filed: Feb. 11, 2011

(86) PCT No.: PCT/EP2011/052040
§ 371 (c)(1),
(2), (4) Date: Dec. 28, 2012

(87) PCT Pub. No.: WO2011/098562
PCT Pub. Date: Aug. 18, 2011

(65) Prior Publication Data
US 2013/0190452 A1    Jul. 25, 2013

(30) Foreign Application Priority Data

Feb. 11, 2010 (EP) ..................................... 10153324
Feb. 11, 2010 (EP) ..................................... 10153326
Feb. 11, 2010 (EP) ..................................... 10153330

(51) Int. Cl.
| | |
|---|---|
| *C08K 5/32* | (2006.01) |
| *C08K 5/3432* | (2006.01) |
| *C08L 63/00* | (2006.01) |
| *C08L 63/02* | (2006.01) |
| *C08L 63/10* | (2006.01) |
| *C08L 35/02* | (2006.01) |
| *C08K 5/00* | (2006.01) |
| *C08F 299/04* | (2006.01) |
| *C08G 59/50* | (2006.01) |
| *C08G 59/68* | (2006.01) |
| *C08L 67/06* | (2006.01) |

(52) U.S. Cl.
CPC ............ *C08L 35/02* (2013.01); *C08F 299/0492* (2013.01); *C08G 59/5006* (2013.01); *C08G 59/68* (2013.01); *C08G 59/681* (2013.01); *C08K 5/005* (2013.01); *C08K 5/3432* (2013.01); *C08L 63/00* (2013.01); *C08L 63/10* (2013.01); *C08L 67/06* (2013.01); *C08K 5/0091* (2013.01); *C08K 5/32* (2013.01); *C08L 2205/02* (2013.01)

(58) Field of Classification Search
None
See application file for complete search history.

(56) References Cited

U.S. PATENT DOCUMENTS

| | | | |
|---|---|---|---|
| 3,508,951 A * | 4/1970 | Shimp et al. ................... | 428/414 |
| 4,051,195 A * | 9/1977 | McWhorter ................... | 528/106 |
| 4,309,511 A | 1/1982 | Jefferson et al. | |
| 5,235,010 A | 8/1993 | Giovando | |
| 2002/0117259 A1 * | 8/2002 | Giroux et al. ................. | 156/330 |

FOREIGN PATENT DOCUMENTS

| | | |
|---|---|---|
| EP | 0 043484 | 1/1982 |
| JP | 54-55093 | 5/1979 |
| WO | WO 2008/003493 | 1/2008 |
| WO | WO 2008/003501 | 1/2008 |

OTHER PUBLICATIONS

International Search Report for PCT/EP2011/052040 mailed Mar. 31, 2011.
Written Opinion of the International Searching Authority mailed Mar. 31, 2011.
Database WPI, Week 197924, Thomson Scientific, London, XP002629368.
K. Dean et al., "Curing Behaviour of IPNs Formed from Model VERs and Epoxy Systems I Amine Cured Epoxy", Polymer, vol. 42, No. 4, Feb. 1, 2001, pp. 1345-1359.

* cited by examiner

*Primary Examiner* — Robert Sellers
(74) *Attorney, Agent, or Firm* — Nixon & Vanderhye P.C.

(57) ABSTRACT

The present invention relates to a multicomponent resin system comprising a. a compound capable of undergoing a radical copolymerization selected from the group consisting of unsaturated polyester resins, vinyl ester resins and mixtures thereof b. an epoxide functional resin as compound capable of reacting with a primary and/or secondary aliphatic amine, c. a transition metal compound, d. a primary and/or secondary aliphatic amine characterized in that the transition metal is selected from the group consisting of Cu, Mn, Fe and mixtures thereof.

17 Claims, No Drawings

MULTICOMPONENT RESIN SYSTEM

This application is the U.S. national phase of International Application No. PCT/EP2011/052040 filed 11 Feb. 2011 which designated the U.S. and claims priority to EP 10153326.3 filed 11 Feb. 2010, EP 10153324.8 filed 11 Feb. 2010, EP 10153330.5 filed 11 Feb. 2010, the entire contents of each of which are hereby incorporated by reference.

The present invention relates to a multicomponent resin system comprising (a) a compound capable of undergoing a radical copolymerization, (b) a compound capable of reacting with a primary and/or secondary aliphatic amine and (d) a primary and/or secondary aliphatic amine, which resin system is curable with a peroxide and the curing is accelerated with a transition metal compound (c). Upon curing, a hybrid cured resin network can be obtained. Hybrid curing refers to curing effected by at least two different reaction mechanisms. Such multicomponent resin system is used for obtaining an Interpenetrating Polymer Network (IPN). As used herein, an Interpenetrating Polymer Network is a composition of at least two chemically distinct polymer networks that are at least partially interlaced on a molecular scale and that are optionally covalently bonded to each other. Besides true IPNs in which no covalent binding exists between the polymer networks, also semi IPNs can be formed. In a semi IPN, the two networks are covalently linked via a linking component which can react with the amine as well as can undergo a radical polymerisation. In case covalent binding is present between the polymer networks, the IPN is referred to as a semi IPN. In an IPN each network may retain its individual properties. As a result an improvement in properties can be attained as in an IPN the individual properties of at least two networks are combined.

In the article "Curing behaviour of IPNs formed from model VERs and epoxy systems I amine cured epoxy", K. Dean, W. D. Cook, M. D. Zipper, P. Burchill, Polymer 42 (2001), 1345-1359, it is described that one thermoset polymer network is formed by radical copolymerization of vinyl ester resin (being a compound capable of undergoing a radical copolymerization) dissolved in styrene with a radical initiator such as a peroxide. The other thermoset polymer network is formed by step growth copolymerization of an epoxy compound with an amine. The primary amine initially reacts with the epoxy group followed by the reaction of the secondary amine. It is also described that when cumene hydroperoxide, benzoyl peroxide or methyl ethyl ketone peroxide, with or without cobalt octoate, were used as the radical initiating systems, premature depletion of the initiator system occurs. The latter being disadvantageous for the radical curing. Furthermore the curing is effected at higher temperatures of at least 75° C.

The present invention relates to multicomponent thermosetting resin systems. Thermosetting resins are generally used to produce a composite material for obtaining a structural object. As meant herein, structural objects are considered to have a thickness of at least 0.5 mm and appropriate (depending on the ultimate application of the structural object) mechanical properties.

One of the more demanding structural applications is the chemical anchoring application, as in this application the mechanical strength of the cured resin, the adhesion of the cured resin to concrete and the adhesion of the cured resin to steel must be very good. Chemical anchoring refers to chemical fastening of anchoring elements such as tie bars, dowels, rock bolts, screws, anchor rods in boreholes of any kind of substrate such as for example concrete, bricks, natural and artificial rocks. A test for evaluating the mechanical strength of the cured resin, the adhesion of the cured resin to concrete and the adhesion of the cured resin to steel is the pull-out test. A low pull-out value represents a low tensile strength, low adhesion to metal and/or to concrete. In chemical anchoring applications, the pull-out values are preferably high under different circumstances, including under severe conditions such as low temperature circumstances (wintertime and/or high latitudes) as well as high temperature circumstances (summertime and/or low latitudes).

It has furthermore been found that the performance at lower temperature (at room temperature or lower) of hybrid cured resin networks obtained upon adding an aliphatic amine and a peroxide as used in the above mentioned Cook reference, to a hybrid resin system comprising (a) a radical curable resin selected from the group consisting of unsaturated polyester resins, vinyl ester resins and mixtures thereof and (b) an epoxide functional resin, is poor.

The object of the invention is to improve the performance at such lower temperature of such hybrid cured resin networks.

It has been found that this can be achieved in that the multicomponent resin system comprises a Cu, Mn and/or Fe compound.

An additional advantage of the resin system according to the invention is that good curing can be obtained under several conditions, including low temperature (at temperature of 0° C. or lower) conditions and high temperature (higher than room temperature) conditions.

WO2010/007148 describes the use of a system comprising a radically polymerisable monomer, a radical former, an epoxide resin and a tertiary amine. In the prior art description part of this patent publication it is said that aliphatic amines, which are known to be able to harden epoxide resins, are not applicable in hybrid systems of (meth)acrylates and epoxide resins as aliphatic amines retard the radical polymerization of (meth)acrylates. In the light thereof, this patent publication teaches to apply a tertiary amine as catalyst for the hydroxyl-epoxy addition reaction.

End segments where the resin systems according to the present invention can be applied are chemical anchoring, but the resin systems can also be used to obtain for example automotive parts, boats, roofing, construction, containers, relining, pipes, tanks, flooring, windmill blades.

The present invention thus relates to a multicomponent resin system, curable with a peroxide, comprising (a) a compound capable of undergoing a radical copolymerization selected from the group consisting of unsaturated polyester resins, vinyl ester resins and mixtures thereof, (b) an epoxide functional resin as compound capable of reacting with a primary and/or secondary aliphatic amine, and (c) a transition metal compound and (d) a primary and/or secondary aliphatic amine, wherein the transition metal of the transition metal compound is selected from the group consisting of Cu, Mn, Fe and mixtures thereof.

Preferably, the transition metal of the transition metal compound is selected from the group consisting of Cu, Mn and Fe. More preferably, the transition metal of the transition metal compound is selected from the group consisting of Cu, Mn and mixtures thereof.

The use of the multicomponent resin system according to the invention requires mixing of the compounds (a), (b) and (c) together with a hardener, in particular compound (d) and a peroxide to obtain a hybrid cured resin network. As used herein, multicomponent resin systems means that the different compounds of the system are present in at least two spatially separated components in order to prevent premature polymerization of the compounds prior to the use of the multicomponent resin system to obtain the hybrid cured resin network. The multicomponent resin system according to the invention comprises at least two components.

In one embodiment, the multicomponent resin system comprises at least three components A, B and C, whereby component A consists of a resin composition comprising a compound (a) capable of undergoing a radical copolymerization selected from the group consisting of unsaturated polyester resins, vinyl ester resins and mixtures thereof; an epoxide functional resin (b) as compound capable of reacting with a primary and/or secondary aliphatic amine and a transition metal compound (c); component B consists of a composition comprising a peroxide and component C consists of a composition comprising a primary and/or secondary aliphatic amine (d). In a preferred embodiment, the multicomponent resin system is a three component system consisting of three components A, B and C, wherein component A consists of a resin composition comprising compounds (a), (b) and (c) as described above; component B consists of a composition comprising a peroxide and component C consists of a composition comprising a primary and/or secondary aliphatic amine (compound (d)). The use of the three component resin system according to the invention requires mixing of the components A, B and C to obtain a hybrid cured resin network. Mixing of components A, B and C can be done in various ways. A preferred way is first mixing component A with component C and then adding component B.

In another embodiment, the multicomponent resin system comprises at least two components A and B, whereby component A consists of a resin composition comprising a compound (a) capable of undergoing a radical copolymerization selected from the group consisting of unsaturated polyester resins, vinyl ester resins and mixtures thereof, an epoxide functional resin as compound (b) capable of reacting with a primary and/or secondary aliphatic amine and a transition metal compound (c); and component B consists of a composition comprising a peroxide and a primary and/or secondary aliphatic amine (d). In a preferred embodiment, the multicomponent resin system is a two component system consisting of two components A and B, wherein component A consists of a resin composition comprising compounds (a), (b) and (c) as described above and component B consists of a composition comprising a peroxide and a primary and/or secondary aliphatic amine (compound (d)). The use of the two component resin system according to the invention requires mixing of the components A and B to obtain a hybrid cured resin network.

The peroxide used for the initiation of the radical copolymerization can be any peroxide known to the person skilled in the art for being used in curing of unsaturated polyester resins and/or vinyl ester resins. Such peroxides include organic and inorganic peroxides, whether solid or liquid; also hydrogen peroxide may be applied. Examples of suitable peroxides are, for instance, peresters, monopercarbonates, perketals, peranhydrides, hydroperoxides and perethers. The required amount of peroxide can be easily determined by a person skilled in the art and the amount can be varied within wide ranges, in general higher than 0.0001 wt. % and less than 20 wt. %, preferably less than 10 wt. % and more preferably less than 5 wt. % (wherein the amount of peroxide is relative to the total amount of curable compounds). The peroxide is preferably a perester and/or a monopercarbonate as the low temperature performance of the hybrid cured resin system can further be improved. More preferably, the peroxide is a perester or a monopercarbonate. Even more preferably, the peroxide is a perester.

The resin system comprises a Cu, Mn and/or Fe compound, preferably a Cu, Mn and/or Fe salt or complex. The resin system preferably comprises a Cu, Mn or Fe compound. The Cu, Mn or Fe compound is preferably a Cu, Mn or Fe carboxylate, more preferably a $C_1$-$C_{30}$ carboxylate and even more preferably a $C_1$-$C_{16}$ carboxylate. Preferably, the resin system comprises a Cu compound and/or a Mn compound as transition metal compound (c). A skilled person will be able to determine a suitable amount of Cu, Mn and Fe compound. The amount of Cu, Mn and Fe compound present in the resin system according to the invention is preferably such that at least 0.0001 mmol Cu, Mn and Fe per kg of curable compounds is present, more preferably at least 0.0025 mmol Cu, Mn and Fe per kg of curable compounds and even more preferably at least 0.025 mmol Cu, Mn and Fe per kg of curable compounds. The upper limit of Cu, Mn and Fe content is not very critical, although for reasons of cost efficiency of course no extremely high concentrations will be applied. Generally the concentration of the Cu, Mn and Fe in the resin system will be lower than 50 mmol Cu, Mn and Fe per kg of curable compounds, preferably lower than 20 mmol Cu, Mn and Fe per kg of curable compounds.

Preferably, at least a primary aliphatic amine is used to cure compound (b). More preferably, a primary aliphatic amine as well a secondary aliphatic amine is used to cure compound (b). Examples of suitable aliphatic amines are: 1,2-diaminoethane; 1,2-diaminopropane; 1,3-diaminopropane; 1,4-diaminobutane; as well as 2-methyl-1,5-diaminopentane; 1,3-diaminopentane; 2,2,4-trimethyl-1,6-diaminohexane; 2,4,4-trimethyl-1,6-diaminohexane; 1-amino-3-aminomethyl-3,5,5-trimethylcyclohexane; 2,2-dimethyl-1,1,3-diaminopropane; 1,3-bis(aminomethyl)cyclohexane; 1,2-diaminocyclohexane and 1,3-bis(aminomethyl)benzene.

The compound (a) capable of undergoing radical copolymerization is an unsaturated polyester resin, a vinyl ester resin or a mixture thereof. As used herein, a vinyl ester resin is a (meth)acrylate containing compound, i.e. a compound comprising at least one reactive (meth)acrylate group. Preferably, the resin system comprises an unsaturated polyester resin or a vinyl ester resin as compound capable of undergoing radical copolymerization. More preferably, the resin system comprises a vinyl ester resin as compound capable of undergoing radical copolymerization. Even more preferably, the compound capable of undergoing radical copolymerization is a vinyl ester resin.

The unsaturated polyester resin or vinyl ester resin used in the context of the present invention may be any such resin as is known to the person skilled in the art. Examples thereof can be found in a review article of M. Malik et al. in J.M.S.—Rev. Macromol. Chem. Phys., C40 (2&3), p. 139-165 (2000). The authors describe a classification of such resins—on the basis of their structure—in five groups:

(1) Ortho-resins: these are based on phthalic anhydride, maleic anhydride, or fumaric acid and glycols, such as 1,2-propylene glycol, ethylene glycol, diethylene glycol, triethylene glycol, 1,3-propylene glycol, dipropylene glycol, tripropylene glycol, neopentyl glycol or hydrogenated bisphenol-A.
(2) Iso-resins: these are prepared from isophthalic acid, maleic anhydride or fumaric acid, and glycols.
(3) Bisphenol-A-fumarates: these are based on ethoxylated bisphenol-A and fumaric acid.
(4) Chlorendics: are resins prepared from chlorine/bromine containing anhydrides or phenols.
(5) Vinyl ester resins: these are resins, which are mostly used because of their hydrolytic resistance and excellent mechanical properties. They have unsaturated sites only in the terminal position, for example introduced by reaction of epoxy resins (e.g. diglycidyl ether of bisphenol-A, epoxies of the phenol-novolac type, or epoxies based on tetrabromobisphenol-A) with (meth)acrylic acid. Instead of (meth)acrylic acid also (meth)acrylamide may be used.

Besides the vinyl ester resins as described in Malik et al., also the class of vinyl ester urethane resins (also referred to urethane(meth)acylate resins) are herein considered to be vinyl ester resins. A preferred vinyl ester resin is an oligomer or polymer containing at least one (meth)acrylate functional end group, also known as (meth)acrylate functional resins. This also includes the class of vinyl ester urethane resins. Preferred vinyl ester resins are methacrylate functional resins including urethane methacrylate resins. Preferred methacrylate functional resins are resins obtained by reaction of an epoxy oligomer or polymer with methacrylic acid or methacrylamide, preferably with methacrylic acid.

The compound (a) capable of undergoing radical copolymerization preferably has a number-average molecular weight $M_n$ of at least 200 Dalton, more preferably of at least 300 Dalton and even more preferably of at least 500 Dalton. The compound capable of undergoing radical copolymerization preferably has a number-average molecular weight of at most 10.000 Dalton and more preferably at most 5000 Dalton. As used herein, the number-average molecular weight ($M_n$) is determined in tetrahydrofuran using GPC employing polystyrene standards.

The compound (a) capable of undergoing radical copolymerization preferably has an acid value as low as possible in order to prevent salt formation of the radical polymerisable compound with the amine. The compound capable of undergoing radical copolymerization preferably has an acid value of at most 60 mg KOH/g (determined according to ISO 2114-2000), more preferably of at most 40 mg KOH/g, more preferably of at most 10 mg KOH/g, even more preferably of at most 5 mg KOH/g and even more preferably 0 mg KOH/g. In view of this, a vinyl ester resin is preferably applied as compound capable of undergoing radical copolymerization.

The system according to the invention comprises an epoxide functional resin, i.e. a resin containing at least one epoxide group, as compound (b) capable of reacting with a primary and/or secondary aliphatic amine. More preferably, the compound capable of reacting with a primary and/or secondary aliphatic amine is an epoxide functional resin. Preferably, the system according to the invention comprises a bisepoxide (containing two epoxide groups) as epoxide functional resin. In a preferred embodiment, the epoxide functional resin is a bisepoxide.

Preferably, the epoxide functional resin comprises a glycidylether as epoxide functionality. In a preferred embodiment, the resin system according to the invention comprises a glycidylether as epoxide functional resin. In a more preferred embodiment, the epoxide functional resin is a glycidylether.

The compound (b) capable of reacting with a primary and/or secondary aliphatic amine preferably has a number-average molecular weight $M_n$ of at least 300 Dalton, more preferably of at least 500 Dalton and even more preferably of at least 750 Dalton. The compound capable of reacting with a primary and/or secondary aliphatic amine preferably has a number-average molecular weight of at most 10.000 Dalton and more preferably of at most 5000 Dalton.

In case the resin system comprises an unsaturated polyester resin and/or a (meth)acrylate functional resin, the resin system preferably further comprises a reactive diluent. The diluent, for instance, will be applied for adjustment of the viscosity of the resin system in order to make handling thereof more easy. Moreover, adjustment of cross-linking in the cured products may be achieved if the diluent contains groups that are reactive with the reactive moieties in the resin. In such case, the diluent is called a reactive diluent. A reactive diluent may contain all kinds of such reactive groups, but the groups may also be identical to reactive moieties in the resin.

In one embodiment of the present invention, at least part of the reactive diluent is capable of reacting with a primary and/or secondary aliphatic amine.

In another and more preferred embodiment, at least part of the reactive diluent is capable of a radical copolymerization. Examples of suitable monomers are, for instance, alkenyl aromatic monomer, such as for example styrene and divinylbenzene, (meth)acrylates, vinyl ethers and vinyl amides but all other reactive monomers for use in the field of thermosetting resins as are known to the person skilled in the art can be used. Preferred monomers are styrene, alpha-methyl styrene, chlorostyrene, vinyl toluene, divinyl benzene, methyl methacrylate, tert.butyl styrene, tert.butylacrylate, butanediol dimethacrylate and mixtures thereof. Suitable examples of (meth)acrylates reactive diluents are PEG200 di(meth)acrylate, 1,4-butanediol di(meth)acrylate, 1,3-butanediol di(meth)acrylate, 2,3-butanedioldi(meth)acrylate, 1,6-hexanediol di(meth)acrylate and its isomers, diethyleneglycol di(meth)acrylate, triethyleneglycol di(meth)acrylate, glycerol di(meth)acrylate, trimethylolpropane di(meth)acrylate, neopentyl glycol di(meth)acrylate, dipropyleneglycol di(meth)acrylate, tripropyleneglycol di(meth)acrylate, PPG250 di(meth)acrylate, tricyclodecane dimethylol di(meth)acrylate, 1,10-decanediol di(meth)acrylate, tetraethylene glycol di(meth)acrylate and trimethylolpropanetri (meth)acrylate. Preferably, a (meth)acrylate is used as reactive diluent.

In still another embodiment, at least part of the reactive diluent is capable of both reacting with a primary and/or secondary aliphatic amine as well as being capable of radical copolymerization in which case a semi IPN will be formed.

In a preferred embodiment of the present invention, the resin system comprises a bridging compound having at least two reactive functionalities, of which one functionality is capable of undergoing a radical copolymerization and one functionality is capable of reacting with a primary and/or secondary aliphatic amine. It has been found that presence of such a bridging compound results in that the low temperature performance is even more improved.

Preferably, the bridging compound contains a radical curable functionality, i.e. a functionality capable of undergoing a radical copoymerisation, selected from the group consisting of acrylate, methacrylate, vinyl ether, vinyl ester and allyl ether, more preferably being a methacrylate or acrylate and even more preferably being a methacrylate. More preferably, the radical curable functionality of the bridging compound is selected from acrylate, methacrylate, vinyl ether, vinyl ester and allyl ether, more preferably is a methacrylate or acrylate and even more preferably is a methacrylate.

Preferably, the bridging compound contains an isocyanate, an epoxide, an acetoacetoxy, an oxalic-amide or a cyclic carbonate as functionality capable of reacting with a primary and/or secondary aliphatic amine, more preferably an epoxide and even more preferably a glycidyl ether. More preferably, the functionality of the bridging component capable of reacting with a primary and/or secondary aliphatic amine is selected from the group consisting of an isocyanate, an epoxide and a cyclic carbonate, more preferably is an epoxide and even more preferably is a glycidyl ether.

In a preferred embodiment, the radical copolymerizable functionality of the bridging compound is a methacrylate and the amine reactive functionality is an epoxide functionality.

Preferably, the $M_n$ of the bridging compound is less than 400 Dalton as this results in that the low temperature performance is even more improved, more preferably less than 350 Dalton, even more preferably less than 300 Dalton and even more preferably less than 250 Dalton.

In a preferred embodiment, the resin system comprises glycidylmethacrylate as bridging compound. In a more preferred embodiment, the bridging compound is glycidylmethacrylate.

The molar ratio of radical polymerizable functionalities and the funtionalities capable of reacting with the primary and/or secondary aliphatic amine in the resin system according to the invention is preferably from 10:1 to 1:10, more preferably from 5:1 to 1:5 and even more preferably from 3:1 to 1:3. As used herein, for all upper and/or lower boundaries of any range given, the boundary value is included in the range.

The molar ratio of epoxide functionalities and amine —NH— functionalities in the resin system according to the invention is preferably from 5:1 to 1:5, more preferably from 3:1 to 1:3, even more preferably from 2:1 to 1:2, even more preferably from 1.5:1 to 1:1.5 and most preferably 1:1. For clarity, a primary amine has two NH functionalities and a secondary amine has one NH functionality.

The resin system preferably further comprises a storage stabilizer in order to further improve its storage stability. Preferably, the storage stabilizer is selected from the group of stable radicals, phenolic compounds, hydroquinones, catechols, phenothiazines and mixtures thereof. Suitable examples of storage stabilizers that can be used for improving the storage stability of the resin compositions according to the invention are, for instance, 2-methoxyphenol, 4-methoxyphenol, 2,6-di-t-butyl-4-methylphenol, 2,6-di-t-butylphenol, 2,4,6-trimethyl-phenol, 2,4,6-tris-dimethylaminomethyl phenol, 4,4'-thio-bis(3-methyl-6-t-butylphenol), 4,4'-isopropylidene diphenol, 2,4-di-t-butylphenol, 6,6'-di-t-butyl-2,2'-methylene di-p-cresol, hydroquinone, 2-methylhydroquinone, 2-t-butylhydroquinone, 2,5-di-t-butylhydroquinone, 2,6-di-t-butylhydroquinone, 2,6-dimethylhydroquinone , 2,3,5-trimethylhydroquinone, catechol, 4-t-butylcatechol, 4,6-di-t-butylcatechol, benzoquinone, 2,3,5,6-tetrachloro-1,4-benzoquinone, methylbenzoquinone, 2,6-dimethylbenzoquinone, napthoquinone, 1-oxyl-2,2,6,6-tetramethylpiperidine, 1-oxyl-2,2,6,6-tetramethylpiperidine-4-ol (a compound also referred to as TEMPOL), 1-oxyl-2,2,6,6-tetramethylpiperidine-4-one (a compound also referred to as TEMPON), 1-oxyl-2,2,6,6-tetramethyl-4-carboxyl-piperidine (a compound also referred to as 4-carboxy-TEMPO), 1-oxyl-2,2,5,5-tetramethylpyrrolidine, 1-oxyl-2,2,5,5-tetramethyl-3-carboxylpyrrolidine (also called 3-carboxy-PROXYL), galvinoxyl, aluminium-N-nitrosophenyl hydroxylamine, diethylhydroxylamine, phenothiazine and/or derivatives or combinations of any of these compounds.

As is known in the art, storage stabilizers (in the art often referred to as polymerisation inhibitors or shortly to inhibitors) are usually present in curable resin compositions for preventing premature gelation and as such to increase the shelf life. Besides this effect on storage stability, inhibitors can also be used to tune the gel time of the curing upon addition of the curing agent. Generally, as inhibitors consume radicals, all inhibitors retard the polymerisation and prolong the gel time of the curing upon addition of the curing agent. A certain gel time is required to ensure a sufficient working time for the user when applying resin systems. The storage stabilizer(s) is preferably present in the component of the multicomponent resin system that comprises at least compound (a).

It has now surprisingly been found that only stable oxyl radicals and phenothiazines are able to prolong the gel time of the curing, upon addition of an aliphatic amine and a peroxide, of resin compositions comprising an unsaturated polyester resin and/or a vinyl ester resin as compound capable of undergoing a radical copolymerization and an epoxide functional resin as compound capable of reacting with a primary and/or secondary aliphatic amine.

Using a phenolic compound or a dihydroxy aromatic compound, which are frequently applied as storage stabilizers for methacrylates, does not give the desired retarding effect on the curing. In particular, phenolic compounds, like for example BHT (2,6-di-t.butyl-4-methyl-phenol) and p-methoxy phenol, surprisingly hardly influence the gel time, while dihydroxy aromatic compounds, like for example the hydroquinones and the catechols, surprisingly accelerates the curing instead of retarding the curing.

The resin system according to the invention thus preferably further comprises a stable (at room temperature and atmospheric pressure) oxyl radical and/or a phenothiazine as polymerization inhibitor. As used herein, a polymerization inhibitor is a compound that retards the curing, upon addition of a peroxide and a primary and/or secondary aliphatic amine, of a composition comprising an unsaturated polyester resin and/or a vinyl ester resin as compound capable of undergoing a radical copolymerization and an epoxide functional resin as compound capable of reacting with a primary and/or secondary aliphatic amine, and thus prolongs the gel time.

The stable oxyl radical is preferably selected from the group of stable N-oxyl radicals according to the following formula

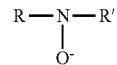

in which R and R' are the same or different $C_1$-$C_{20}$ alkyl or $C_7$-$C_{20}$ alkylaryl. R and R' may be part of a cycloalkyl group. Preferably, R and R' are the same or different $C_1$-$C_{20}$ alkyl, more preferably tert. $C_1$-$C_{20}$ alkyl.

In one embodiment of the present invention, the curing, upon addition of a peroxide and a primary and/or secondary aliphatic amine, of a composition comprising an unsaturated polyester resin and/or a vinyl ester resin as compound capable of undergoing a radical copolymerization and an epoxide functional resin as compound capable of reacting with the primary and/or secondary aliphatic amine, is retarded by effecting the curing in the presence of a stable oxyl radical. A person skilled in the art will be able to determine a suitable amount of such stable oxyl radical as is to be used for achieving a desired retarding of the curing. The amount of stable oxyl radical (relative to the total resin composition) is preferably at least 10 ppm, more preferably at least 25 ppm. The amount of stable oxyl radical (relative to the total resin composition) is preferably at most 500 ppm, more preferably at most 200 ppm. In a preferred embodiment, the amount of stable oxyl radical (relative to the total resin composition) is from 10 ppm to 500 ppm. Accordingly, in one embodiment of the present invention, the resin system according to the invention comprises a stable oxyl radical resulting in that the shelf life can be prolonged and the gel time can be increased.

In another embodiment of the present invention, the curing, upon addition of a peroxide and a primary and/or secondary aliphatic amine, of a composition comprising an unsaturated polyester resin and/or a vinyl ester resin as compound capable of undergoing a radical copolymerization and an epoxide functional resin as compound capable of reacting with the primary and/or secondary aliphatic amine, is retarded by effecting the curing in the presence of a phenothiazine. A person skilled in the art will be able to determine a suitable amount of such phenothiazine as is to be used for achieving a desired retarding of the curing. The amount of phenothiazine (relative to the total resin composition) is preferably at least 10 ppm, more preferably at least 100 ppm and even more preferably at least 200 ppm. The amount of phenothiazine (relative to the total resin composition) is preferably at most 15000 ppm. In a preferred embodiment, the amount of phenothiazine (relative to the total resin composition) is from 200 ppm to 15000 ppm. Accordingly, in this embodiment of the present invention, the resin system according to the invention comprises a phenothiazine resulting in that the gel time can be increased and further surprisingly resulting in that the low temperature performance of the hybrid cured resin system can be maintained or even increased.

In another embodiment, the resin system according to the invention comprises a stable oxyl radical and a dihydroxy benzene compound. Examples of suitable dihydroxy benzene compounds are hydroquinones, catechols and resorcinols. In this embodiment of the invention, the shelf life of the resin system can be prolonged and the curing (as for example demonstrated by the gel time), upon addition of a peroxide and a primary and/or secondary aliphatic amine, of resin compositions comprising an unsaturated polyester resin and/or a vinyl ester resin as compound capable of undergoing a radical copolymerization and an epoxide functional resin as compound capable of reacting with a primary and/or secondary aliphatic amine, can be tuned by effecting the curing in the presence of a stable oxyl radical and a dihydroxy benzene compound. The curing can be tuned as desired by selecting appropriate amounts of the stable oxyl radical and of the dihydroxybenzene compound. A person skilled in the art will be able to determine appropriate amounts of such stable oxyl radical and dihydroxy benzene compound as is to be used for achieving the desired tuning effect of the curing. The amount of dihydroxy benzene compound (relative to the total resin composition) is preferably at least 10 ppm, more preferably at least 25 ppm. The amount of dihydroxy benzene compound (relative to the total resin composition) is preferably at most 500 ppm, more preferably at most 200 ppm. In a preferred embodiment, the amount of dihydroxy benzene compound (relative to the total resin composition) is from 10 ppm to 500 ppm. Preferred dihydroxy benzene compounds are 1,2-and 1,4-dihydroxybenzene compounds, which compounds optionally further contain other substituents on the benzene group.

It has further surprisingly been found that the presence of a stable oxy radical as well as a dihydroxy benzene compound in the resin system according to the invention results in a synergistic effect on pull out performance at room temperature. The improvement in pull out performance is greater with a stable oxy radical plus a dihydroxy benzene compound than the effect of each separately.

In still another embodiment, the resin system according to the invention comprises a phenothiazine and a dihydroxy benzene compound. In this embodiment of the invention, the low temperature performance of the hybrid cured resin system can be increased and the curing (as for example demonstrated by the gel time), upon addition of a peroxide and a primary and/or secondary aliphatic amine, of resin compositions comprising an unsaturated polyester resin and/or a vinyl ester resin as compound capable of undergoing a radical copolymerization and an epoxide functional resin as compound capable of reacting with a primary and/or secondary aliphatic amine, can be tuned by effecting the curing in the presence of a phenothiazine and a dihydroxy benzene compound. The curing can be tuned as desired by selecting appropriate amounts of the phenothiazine and of the dihydroxybenzene compound. A person skilled in the art will be able to determine appropriate amounts of such phenothiazine and dihydroxy benzene compound as is to be used for achieving the desired tuning effect of the curing.

In still another embodiment, the resin system according to the invention comprises a stable oxyl radical, a phenothiazine and a dihydroxy benzene compound. In this embodiment of the invention, the low temperature performance of the hybrid cured resin system can be increased, the shelf life of the resin system can be prolonged and the curing (as for example demonstrated by the gel time), upon addition of a peroxide and a primary and/or secondary aliphatic amine, of resin compositions comprising an unsaturated polyester resin and/or a vinyl ester resin as compound capable of undergoing a radical copolymerization and an epoxide functional resin as compound capable of reacting with a primary and/or secondary aliphatic amine, can be tuned by effecting the curing in the presence of a stable oxyl radical, a phenothiazine and a dihydroxy benzene compound.

In the resin system according to the invention also fillers and/or fibres can be present. A wide variety of fillers can be applied like for instance, without being limited thereto, silica, sand, cement, pigments. A wide variety of fibres can be applied like for instance, without being limited thereto, glass and carbon fibres.

The present invention also relates to a process for curing the multicomponent resin system according to the invention by mixing the compounds of the multicomponent resin system together with a peroxide or by mixing the different components of the multicomponent resin system as described above. The curing is preferably effected at a temperature in the range of from −20 to +200° C., preferably in the range of from −20 to +100° C., and most preferably in the range of from −10 to +60° C. (so-called cold curing). Preferably, a monopercarbonate or a perester is used as peroxide. More preferably, a perester is used as peroxide. In case the peroxide and the aliphatic amine are separately mixed into the resin composition, in which embodiment use is preferably made of a three component resin system as described above, the aliphatic amine is preferably first added to the resin composition, followed by adding the peroxide. In another embodiment, the amine and the peroxide are first mixed and the resulting mixture is mixed into the resin composition according to the invention. In this embodiment, use is preferably made of a two component system as described above.

In a preferred embodiment, the curing of the resin composition is effected with a primary aliphatic amine and/or a secondary aliphatic amine and with a perester.

The present invention further relates to cured structural objects obtained by curing a multicomponent resin system comprising compounds (a), (b), (c) and (d) with a peroxide or obtained by mixing the different components of the multicomponent system or obtained with the process for curing as described above.

The present invention further relates to the use of the cured objects in anyone of the areas of automotive parts, boats, chemical anchoring, roofing, construction, containers, relining, pipes, tanks, flooring, windmill blades The invention is now demonstrated by means of a series of examples and comparative examples. All examples are supportive of the scope of claims. The invention, however, is not restricted to the specific embodiments as shown in the examples.

Gel Timer Experiments

In most of the Examples and Comparative Examples presented hereinafter it is mentioned, that curing was monitored by means of standard gel time equipment. This is intended to mean that both the gel time ($T_{gel}$ or $T_{25 \to 35°C}$) and peak time ($T_{peak}$ or $T_{25 \to peak}$) were determined by exotherm measurements according to the method of DIN 16945 when curing the resin with the peroxides as indicated in the Examples and Comparative Examples. The equipment used therefore was a Soform gel timer, with a Peakpro software package and National Instruments hardware; the waterbath and thermostat used were respectively Haake W26, and Haake DL30

Pull Out Experiments

The mechanical strength of the cured composition was assessed analogous to a pull out test from concrete using as standard a 14 mm drill hole and an M12 12.9 steel anchor with a setting depth of 72 mm using a confined setting for pulling.

In this test the unfilled resin formulations were used. The cited values (kNewton) are an average of 6 measurements.

Resin Mixture A

A resin formulation was prepared by mixing 1.93 kg bisphenol A glycerolate dimethacrylate (compound (a); vinyl ester resin), 5.14 kg bisphenol A diglycidylether (compound (b); bisepoxide), 1.28 kg butanediol dimethacrylate BDDMA (reactive diluent) and 1.61 kg glycidylmethacrylate (bridging compound).

EXAMPLE 1-10 AND COMPARATIVE EXPERIMENTS A-K

Final formulation were prepared as listed in the tables below (amounts are in g) based on 100 g of resin mixture A.

TABLE 1

| | Accelerator | Dytek A (1,5-diamino-2-methylpentane; Aldrich) | Peroxide (Akzo Nobel) | Amount peroxide | Load value at −5° C. | Gel time (min) | Peak time (min) | Peak Temp (° C.) |
|---|---|---|---|---|---|---|---|---|
| 1 | 0.15 g Cu (8 wt %) solution | 12.4 | Trigonox C (perester) | 0.5 | 41 | 1.4 | 5.2 | 237 |
| 2 | 0.15 g Cu (8 wt %) solution | 12.4 | Trigonox 117 (monopercarbonate) | 0.5 | 40 | 1.3 | 5.4 | 236 |
| A | 0.2 g Co (6 wt %) solution | 12.4 | Butanox M50 (perketal) | 0.5 | <0.1 (m*) | 6.7 | 68 | 56 |
| B | 0.24 g dimethylaniline | 12.4 | Perkadox 20S (peranhydride) | 2.5 | <0.1 (m*) | 22 | 86 | 39 |
| C | None | 12.4 | none | | <0.1 (m*) | 45 | 110 | 37 |
| D | None | 12.4 | Trigonox AW70 (Hydroperoxide) | 0.5 | <0.1 (m*) | 38.2 | 167 | 45 |
| E | None | 12.4 | Peroxan CU-80L(Hydroperoxide) | 0.5 | <0.1 (m*) | 63.9 | 108 | 37 |
| F | None | 12.4 | Trigonox 44B (Perketal) | 0.5 | <0.1 (m*) | 44.7 | 101 | 39 |
| G | None | 12.4 | Butanox M50 | 0.5 | <0.1 (m*) | 48.2 | 103 | 38 |
| H | None | 12.4 | Trigonox 117 | 0.5 | <0.1 (m*) | 54 | 101 | 38 |
| I | None | 12.4 | Perkadox 20S | 0.5 | <0.1 (m*) | 21 | 86 | 40 |
| J | None | 12.4 | Trigonox B (perether) | 0.5 | <0.1 (m*) | 59 | 101 | 37 |
| K | None | 12.4 | Trigonox C | 0.5 | <0.1 (m*) | 109 | 109 | 35 |

(m*) = the anchor can be removed manually

These experiments initially demonstrate that both a peroxide selected from the group of peresters, eg Trigonox C, and mono-percarbonates, eg Trigonox 117, and a transition metal accelerator is needed to obtain a quick and good curing at room temperature as indicated by the gel time and high peak exotherm as well as a good mechanical strength at low temperatures as indicated by the pull out values at −5° C. However, it also shows that the peroxide based cure systems as used by Cook et al., i.e. Co/Butanox M50, Peroxan CU80L or Trigonox B do not result in good mechanical properties at low temperatures nor do they yield a sufficient radical curing at room temperature (see table 2; amounts are in g). Also another standard cure system BPO/amine does not result in good mechanical properties at low temperatures.

TABLE 2

| | Accelerator | Dytek A (g) | Peroxide (Akzo Nobel) | Amount peroxide (g) | Load value @ room temperature RT |
|---|---|---|---|---|---|
| 1 | 0.15 g Cu (8 wt %) solution | 12.4 | Trigonox C (perester) | 0.5 | 79 |
| 2 | 0.15 g Cu (8 wt %) solution | 12.4 | Trigonox 117 (monopercarbonate) | 0.5 | 98 |
| A | 0.2 g Co (6 wt %) solution | 12.4 | Butanox M50 (perketal) | 0.5 | 34 |
| E | None | 12.4 | Peroxan CU-80L (hydroperoxide) | 0.5 | 40 |
| J | None | 12.4 | Trigonox B (perether) | 0.5 | 16 |

As demonstrated in table 3, besides a perester and a monopercarbonate also other peroxides can be used with a transition metal accelerator selected from the group of Cu, Mn and Fe, to obtain a performance @–5° C. and a good value @ RT.

TABLE 3

| Ex | Accelerator | Dytek A (g) | Peroxide (Akzo Nobel) | Amount peroxide (g) | Load value at –5° C. | Load value @ room temperature RT |
|---|---|---|---|---|---|---|
| 3 | 0.15 g Cu (8 wt %) solution | 12.4 | Trigonox AW70 (hydroperoxide) | 0.5 | 21.2 | 99.7 |
| 4 | 0.15 g Cu (8 wt %) solution | 12.4 | Peroxan CU80L (hydroperoxide) | 0.5 | 27.6 | 93.2 |
| 5 | 0.15 g Cu (8 wt %) solution | 12.4 | Trigonox 44B (perketal) | 0.5 | 49.6 | 90.8 |
| 6 | 0.12 g Mn (10 wt %) solution | 12.4 | Trigonox C (perester) | 0.5 | 38.4 | 76.6 |
| 7 | 0.12 g Mn (10 wt %) solution | 12.4 | Trigonox 117 (monopercarbonate) | 0.5 | 16.6 | 73 |
| 8 | 0.12 g Mn (10 wt %) solution | 12.4 | Trigonox AW70 (hydroperoxide) | 0.5 | 42.2 | 90.2 |
| 9 | 0.12 g Mn (10 wt %) solution | 12.4 | Peroxan CU80L (hydroperoxide) | 0.5 | 19 | 86.2 |
| 10 | 0.10 g Fe (12 wt %) solution | 12.4 | Trigonox 44B (perketal) | 0.5 | 26.3 | 99.1 |

The combined tables 1-3 clearly demonstrate that a transition metal selected from the group of Cu, Mn and Fe in combination with various peroxides should be used in order to obtain a good performance at room temperature and to obtain improved performance at –5° C.

COMPARATIVE EXPERIMENT L AND EXAMPLES 11-14

Formulations (see table 4, amounts are in g, unless otherwise stated) were prepared by using 100 g of resin mixture A.

TABLE 4

| | Accelerator | Amine | Peroxide | Amount peroxide | Load value @ RT | Load value @ –5° C. |
|---|---|---|---|---|---|---|
| Comp L | 0.13 Co (6 wt %) solution | 12.4 | Trigonox C | 0.5 | 80 | manual |
| 11 | 0.1 Cu (8 wt %) solution | 12.4 | Trigonox C | 0.5 | 79 | 52 |
| 12 | 0.08 Mn (10 wt %) solution | 12.4 | Trigonox C | 0.5 | 78 | 33 |
| 13 | 0.4 Fe (6 wt %) solution | 12.4 | Trigonox C | 1.6 | 102 | 16 |
| 14 | 0.13 Fe (6 wt %) solution | 12.4 | Trigonox C | 0.5 | 65 | 2.7 |

These examples clearly demonstrate that the use of Cu, Mn or Fe compound as accelerator results in an improved low temperature performance compared to the use of Co compound. These examples further demonstrate that Cu and Mn are preferred in combination with a perester with respect to low temperature perfomance.

EXAMPLE 15-21

Formulations were based on using 100 g resin mixture A to which the appropriate amounts of Cu and Tempol were added (see Table 5, amounts are in g, unless otherwise stated). The cured formulations were pulled out after 5 days at room temperature.

TABLE 5

| | Cu (8 wt %) solution | Cu mmol/kg resin mixture A | Tempol (ppm) | Amine | peroxide | Amount peroxide | Load value @ RT (kN) |
|---|---|---|---|---|---|---|---|
| 15 | 0.5 | 6.3 | 20 | 12.4 | Trigonox C | 1 | 107 |
| 16 | 0.2 | 2.5 | 20 | 12.4 | Trigonox C | 1 | 107 |
| 17 | 0.02 | 0.25 | 20 | 12.4 | Trigonox C | 1 | 104 |
| 18 | 0.01 | 0.125 | 20 | 12.4 | Trigonox C | 1 | 107 |
| 19 | 0.002 | 0.025 | 20 | 12.4 | Trigonox C | 1 | 108 |
| 20 | 0.001 | 0.0125 | 20 | 12.4 | Trigonox C | 1 | 80 |
| 21 | 0.0002 | 0.0025 | 20 | 12.4 | Trigonox C | 1 | 55 |

These results clearly indicate that with amounts around 0.0025 mmol Cu/kg resin already good results can be obtained. Furthermore they demonstrate that it is preferred to use amounts higher than 0.0125 mmolCu/kg resin, even more preferably in the range of 0.025 mmol Cu/kg resin. Above 0.025 mmol/kg resin the amount of Cu hardly influences the pull out values any longer.

EXAMPLES 22-27

The formulations were based on 100 g resin mixture A in which 0.1 g of the 8 wt % Cu solution was dissolved, next 20 ppm Tempol was added as inhibitor and after stirring followed by adding Dytek A and the peroxide. The anchors were pulled out after 5 days.

TABLE 6

| | Amine (g on 100 g resin) | peroxide | Amount peroxide (%) | Load value@ RT |
|---|---|---|---|---|
| 22 | 12.4 | Trigonox C | 2 | 87 |
| 23 | 12.4 | Trigonox C | 1 | 92 |
| 24 | 12.4 | Trigonox C | 0.5 | 109 (steal breaks) |
| 25 | 12.4 | Trigonox C | 0.2 | 108 (steal breaks) |
| 26 | 12.4 | Trigonox C | 0.1 | 108 (steal breaks) |
| 27 | 12.4 | Trigonox C | 0.05 | 109 (steal breaks) |

This result indicates that with various amounts of peroxide good results can be obtained

EXAMPLE 28

Resin formulations were based on 100 g resin mixture A in which 0.4 g of the 8 wt % Cu solution was dissolved. The curing was effected by adding to 100 g resin formulation 12.5 g Dytek A and 1.6 g Trigonox C. Several different types of drill holes were used in this example.

TABLE 7

| | Load value |
|---|---|
| 14 mm hole after 4 hrs @ RT | 90 |
| 14 mm hole after 24 hrs @ RT | 97 |
| 18 mm hole after 24 hrs @ RT | 88 |
| 14 mm half cleaned wet hole after 24 hrs @ RT in water | 89 |
| 14 mm hole after 24 hrs @ −5° C., pulling @ −5° C. | 60 |
| 14 mm hole setting at RT then 24 hrs @80° C., pulling @ 80° C. | 64 |

This example clearly demonstrates that good values can be obtained according to the invention both at low as well as high temperatures. Furthermore good values also obtained in large drillholes as well as in wet half cleaned holes, indicating that under various conditions good mechanical properties were obtained.

EXAMPLES 28-32

Resins Used (Compound (a)):

Resin B: bisphenol A glycerolate dimethacrylate (Aldrich) (vinyl ester resin)

Resin C (vinyl ester resin): A reaction vessel was charged with 424.8 g bisphenol A diglycidyl ether and 82 g bisphenol A followed by heating to 160° C. The reaction mixture was kept at this temperature until all the bisphenol A has reacted (at least 2 hrs) followed by cooling to 110° C. at which temperature 126.2 g methacrylic acid was added slowly during at least 1 hr and stirred at this temperature for another hour after which the reaction mixture was cooled to room temperature and resin C was obtained with an acid value <5 mg KOH/g.

Resin D (vinyl ester urethane resin): To a stirred reactor charged with 575 g methylene-1,1'-diphenyl-diisocyanate MDI and 0.3 g dibutyltin dilaurate was added 71 g dipropyleneglycol at such a rate that the temperature did not exceed 60° C. After stirring for 30 min at 60° C., 792 g hydroxypropyl methacrylate HPMA was added and the temperature rose to 90° C. After stirring for 2 hr at 90° C., the mixture was cooled to room temperature after which resin D was obtained.

Resin E (unsaturated polyester resin) : A reaction vessel was charged with 402.6 g propylene glycol, 492.7 g ethylene glycol, 908.6 g maleic anhydride and 196 g phtalic anhydride. The reaction vessel was slowly heated to 140° C. and kept at this temperature for 2 hrs and subsequently heated to 210° C. After 3 hrs at 210° C., vacuum was applied and the reaction was continued till an acid value of 10 mg KOH/g resin was obtained after which the reaction was cooled to room temperature and unsaturated polyester resin E was obtained.

Several formulations were prepared according to table 8 (amounts in g) and cured with Dytek A and Trigonox C (t-butylperbenzoate, Akzo).

TABLE 8

| Example | 28 | 29 | 30 | 31 | 32 |
|---|---|---|---|---|---|
| Resin | B | C | D | D | E |
| Amount | 192 | 192 | 160 | 192 | 160 |
| Reactive diluent | BDDMA | BDDMA | HPMA | BDDMA | BDDMA |
| Amount | 128 | 128 | 160 | 128 | 160 |
| Bisphenol A diglycidylether | 514 | 514 | 514 | 514 | 515 |
| GMA (glycidyl methacrylate) | 161 | 161 | 161 | 161 | 161 |
| Curing | | | | | |
| Cu (8 wt %) solution | 4 | 4 | 4 | 1 | 4 |
| Dytek A | 124 | 124 | 124 | 124 | 124 |
| Trigonox C | 16 | 16 | 16 | 5 | 16 |
| Pull out values (kN) | | | | | |
| 14 mmol hole after 24 hrs @ RT | 97 | 82 | 89 | 92 | 64 |
| 14 mm half cleaned wet hole after 24 hrs @ RT in water | 81 | 63 | 46 | 90 | |
| 14 mm hole after 24 hrs @ −5° C., pulling @ −5° C. | 65 | 64 | | 61.4 | |

These examples clearly demonstrate that various resins can be used according to the invention. Also this indicates that various reactive diluents can be used. BDDMA=1,4-butanedioldimethacrylate; HPMA=hydroxypropylmethacrylate.

EXAMPLES 33-37

Formulations were made from 192 g bisphenol A glycerolate dimethacrylate, 128 g reactive diluents, 161 g glycidylmethacrylate GMA, 514 g bisphenol A diglycidylether and 4 g Cu naphtenate (8 wt % Cu) solution. Curing was performed by adding 124 g Dytek A immediately followed by 16 g Trigonox C.

The results of the pull out test are shown in the next table.

TABLE 9

| Example | Reactive diluent | Load value@ RT (kN) |
|---|---|---|
| 33 | HEMA (hydroxyethylmethacrylate) | 98 |
| 34 | HPMA | 94 |
| 35 | BDDMA | 97 |
| 36 | PEG200DMA (Polyethyleneglcyol200dimethacrylate) | 98 |
| 37 | TMPTMA (trimethylolpropanetrimethacrylate) | 99 |

The examples clearly demonstrate that various reactive diluents can be used.

EXAMPLES 38-40

Formulations were made from 192 g bisphenol A glycerolate dimethacrylate, 128 g butane diol dimethacrylate, 161 g GMA, 514 g bisphenol A diglycidylether and 4 g Cu naphtenate (8 wt % Cu) solution. Curing was performed by adding 124 g of a diamine immediately followed by 16 g Trigonox C.

The results of the pull out test are shown in the next table.

TABLE 10

| Example | Diamine | Load value@ RT (kN) |
|---|---|---|
| 38 | Dytek A | 97 |
| 39 | Isophorone diamine | 83 |
| 40 | Meta-xylylene diamine | 97 |

These examples clearly show that various aliphatic amines can be used according to the invention.

EXAMPLES 41-45

Bisphenol A glycerolate dimethacrylate was diluted with 40% BDDMA. With this diluted resin, various formulations were prepared (see table 11, amounts are in g) and tested in the pullout test.

TABLE 11

| Example | Resin | Bisphenol A diglycidylether | GMA | Cu | Dytek A | Trig C | Load value@ RT (kN) |
|---|---|---|---|---|---|---|---|
| 41 | 17 | 52 | 16.3 | 0.34 | 12.6 | 1.38 | 97 |
| 42 | 27 | 44 | 13.7 | 0.7 | 13.1 | 1.8 | 81 |
| 43 | 28 | 51 | 8.8 | 0.35 | 10.7 | 1.4 | 96 |
| 44 | 40 | 37 | 11.7 | 0.36 | 9 | 1.43 | 99 |
| 45 | 50 | 31 | 9.7 | 0.36 | 7.5 | 1.46 | 93 |

These examples clearly show that various amounts of the compounds can be employed according to the invention

EXAMPLE 46

A resin formulation was prepared based on 2 kg butanediol dimethacrylate, 3 kg bisphenol A diglycidyl ether and 22 g Cu naphtenate (8 wt % Cu) solution. To 100 g of this mixture, various amounts of various compounds x (see table) were added. After having dissolved compound(s) x, the mixtures were cured in the geltimer with 10.2 g Dytek A and 2.2 g Trigonox C. The results are shown in the next table.

TABLE 12

| Compound x | Amount (ppm) | Gel time (min) |
|---|---|---|
| none | | 19.0 |
| Tempol | 50 | 45.4 |
| | 100 | 121 |
| Phenothiazine | 25 | 24.9 |
| p-methoxy phenol | 50 | 21.6 |
| | 100 | 20.2 |
| | 200 | 19.5 |
| 2,6-di-t.butyl-4-methyl-phenol BHT | 50 | 19.7 |
| | 100 | 17.7 |
| | 200 | 15.9 |
| Hydroquinone HQ | 50 | 1.1 |
| | 100 | 0.7 |
| | 200 | 0.7 |
| t.butyl hydroquinone | 50 | 3.9 |
| | 100 | 1.4 |
| | 200 | 1 |
| Catechol | 50 | 2.5 |
| | 100 | 1.3 |
| | 200 | 1.6 |
| t.butyl catechol tBC | 50 | 5.8 |
| | 100 | 4.2 |
| | 200 | 5.2 |
| Tempol + p-methoxyphenol | 25 + 25 | 44.8 |
| | 50 + 50 | 62.8 |
| | 100 + 100 | 142 |
| | 200 + 200 | |
| Tempol + HQ | 25 + 25 | 2.9 |
| | 50 + 50 | 1.2 |
| | 100 + 100 | 0.8 |
| | 200 + 200 | 0.6 |
| Tempol + tBC | 25 + 25 | 18.5 |
| | 50 + 50 | 11.2 |
| | 100 + 100 | 7.6 |
| | 200 + 200 | 6.6 |

These experiments clearly demonstrate that Tempol, being a stable oxyl radical, is a good inhibitor for retarding the curing of the formulations according to the invention. Simple phenolics, which are commonly applied storage stabilizers for methacrylates, like BHT and p-methoxy phenol hardly influence the gel time and are therefore not preferred to use, whereas due to the accelerating effect dihydroxy aromatic compounds like the hydroquinones and catechols are very useful as accelerator. Especially combinations of a stable oxyl radical with a dihydroxyaromatic compound can be very advantageously used to tune the reactivity of these systems. Besides Tempol also phenothiazine is a good inhibitior for obtaining long gel times

EXAMPLES 47-59

A resin formulation was prepared by mixing 1.93 kg bisphenol A glycerolate dimethacrylate, 5.14 kg bisphenol A diglycidylether, 1.28 kg butanediol dimethacrylate, 1.61 kg glycidylmethacrylate and 9.9 g Cu naphtenate (8 wt % Cu) solution.

To 100 g of this mixture various amounts of various inhibitors (see table) were added. After having dissolved the inhibitor(s), the mixtures were cured with 12.4 g Dytek A and 0.5 g Trigonox C

TABLE 13

| | Inhibitor | Amount (ppm) | Load value@ RT (kN) |
|---|---|---|---|
| 47 | None | | 79 |
| 48 | Tempol | 100 | 54 |
| 49 | p-methoxy phenol | 100 | 56 |
| 50 | 2,6-di-t-butyl-p-cresol | 100 | 70 |
| 51 | Hydroquinone | 100 | 75 |
| 52 | t.Butyl catechol | 100 | 96 |
| 53 | Tempol | 100 | 54 |
| 54 | Tempol + p-methoxy phenol | 100 + 100 | 43 |
| 55 | Tempol + 2,6-di-t-butyl-p-cresol | 100 + 100 | 51 |
| 56 | Tempol + hydroquinone | 100 + 100 | 92 |
| 57 | Tempol + t-butyl catechol | 100 + 100 | 102 |

These examples demonstrate that with respect to the pull out values there is even an synergistic effect in employing the combination of a stable oxyl radical with a dihydroxy aromatic as with these combinations higher load values were obtained compared to their individual components, whereas when using a combination of a stable oxyl radical with a simple phenolic compound lower load values of the combination compared to their individual components are found.

TABLE 14

| | Inhibitor | Amount (ppm) | Load value@ −5° C. (kN) | Load value@ RT (kN) | Gel time (min) |
|---|---|---|---|---|---|
| 58 | Tempol + 2-methyl hydroquinone + phenothiazine | 50 + 50 + 100 | 89 | 104 | 1.4 |
| 59 | Tempol + 2-methyl hydroquinone + phenothiazine | 50 + 50 + 5000 | 86 | 102 | 45 |

This table indicates that phenothiazine is a good inhibitor for tuning the gel time without affecting the performance at low temperatures. This result is the more surprising since when tuning the gel time to 45 minutes using Tempol as inhibitor, this results in that the anchor can be removed manually when cured at −5° C.

EXAMPLE 60

A resin formulation was prepared as A component by mixing 193 g bisphenol A glycerolate dimethacrylate, 128 g butanediol dimethacrylate, 514 g bisphenol A diglycidyl ether, 161 g glycidylmethacrylate, 4 g Cu naphtenale in spirits (8 wt % Cu), 0.005 g Tempol and 0.002 g hydroquinone An amine peroxide mixture was prepared as the B component by mixing 124 g Dytek A and 16 g t-butylperbenzoate.

The reactivity of the system was determined in the gel timer using 25 g A component and 3.5 g B component resulting in a gel time of 10.8 min, a peak time of 18.6 min and a peak temperature of 206° C.

After 23 weeks of storing both the A and B component at room temperature the curing was repeated resulting in a gel time of 12.9 min, a peak time of 20.8 min and a peak temperature of 205° C.

This result clearly demonstrates that it is possible to employ a peroxide amine mixture for curing according to the invention

The invention claimed is:
1. A multicomponent resin system comprising:
   (a) a compound capable of undergoing a radical copolymerization selected from the group consisting of unsaturated polyester resins, vinyl ester resins and mixtures thereof,

(b) an epoxide functional resin as compound capable of reacting with a primary and/or secondary aliphatic amine, (c) a transition metal compound wherein the transition metal is selected from the group consisting of Cu, Mn, Fe and mixtures thereof, (d) a primary and/or secondary aliphatic amine, and (e) a bridging compound having at least two reactive functionalities, wherein a first one of the reactive functionalities of the bridging compound is capable of undergoing a radical copolymerization and is selected from the group consisting of acrylate, methacrylate, vinyl ether, vinyl ester and allyl ether, and wherein a second one of the reactive functionalities of the bridging compound is capable of reacting with a primary and/or secondary aliphatic amine and is selected from the group consisting of isocyanate, epoxide, acetoacetoxy, oxalic-amide and cyclic carbonate.

2. The multicomponent resin system according to claim 1, wherein the transition metal is selected from the group consisting of Cu, Mn and mixtures thereof.

3. The multicomponent resin system according to claim 1, wherein the compound (a) capable of undergoing a radical copolymerization is an unsaturated polyester resin or a vinyl ester resin.

4. The multicomponent resin system according to claim 1, wherein the compound (a) capable of undergoing a radical copolymerization is a vinyl ester resin.

5. The multicomponent resin system according to claim 4, wherein the vinyl ester resin is an oligomer or polymer containing at least one (meth)acrylate functional end group.

6. The multicomponent resin system according to claim 1, wherein epoxide functionalitiy of the epoxide functional resin component (b) is a glycidylether.

7. The multicomponent resin system according to claim 1, wherein the first one of the reactive functionalities of the bridging compound is methacrylate, and the second one of the reactive functionalities of the bridging compound is epoxide.

8. The multicomponent resin system according to claim 1, further comprising at least one inhibitor.

9. The multicomponent resin system according to claim 8, wherein the at least one inhibitor comprises a stable oxyl radical.

10. The multicomponent resin system according to claim 8, wherein the at least one inhibitor comprises a phenothiazine.

11. The multicomponent resin system according to claim 1, further comprising a peroxide.

12. The multicomponent resin system according to claim 1, wherein the system comprises at least three components A, B and C, wherein component A consists of a resin composition comprising the compound (a) capable of undergoing a radical copolymerization selected from the group consisting of unsaturated polyester resins, vinyl ester resins and mixtures thereof; an epoxide functional resin as the compound (b) capable of reacting with a primary and/or secondary aliphatic amine, the transition metal compound (c) and the bridging compound (e);

component B consists of a composition comprising a peroxide, and component C consists of a composition comprising the compound (d).

13. The multicomponent resin system according to claim 1, wherein the system comprises at least two components A and B, wherein component A consists of a resin composition comprising the compound (a) capable of undergoing a radical copolymerization selected from the group consisting of unsaturated polyester resins, vinyl ester resins and mixtures thereof; an epoxide functional resin as the compound (b) capable of reacting with a primary and/or secondary aliphatic amine, the transition metal compound (c) and the bridging compound (e); and component B consists of a composition comprising a peroxide and the compound (d).

14. A process for curing the multicomponent resin system according to claim 1, wherein the process comprises effecting curing of the multicomponent resin system by mixing the compounds (a)-(e) of the resin system together with a peroxide.

15. The process according to claim 14, wherein the peroxide is a monopercarbonate or a perester.

16. The process according to claim 14, wherein the peroxide is a perester.

17. Cured structural objects obtained by curing a multicomponent resin system according to claim 1 with a peroxide.

* * * * *